United States Patent [19]

Brumme et al.

[11] Patent Number: 4,613,971
[45] Date of Patent: Sep. 23, 1986

[54] TRANSVERSELY EXCITED GAS LASER

[75] Inventors: Gerhard Brumme, Eching; Ludger Grage, Eichenau; Hinrich Heynisch, Gräfelfing; Erwin Hübner, Grafing, all of Fed. Rep. of Germany

[73] Assignee: Siemens Aktiengesellschaft, Berlin and Munich, Fed. Rep. of Germany

[21] Appl. No.: 599,179

[22] Filed: Apr. 11, 1984

[30] Foreign Application Priority Data

Apr. 15, 1983 [DE] Fed. Rep. of Germany ....... 3313811

[51] Int. Cl.⁴ ............................................. H01S 3/097
[52] U.S. Cl. ...................................... 372/87; 372/86; 372/83
[58] Field of Search ...................... 372/38, 83, 86, 82, 372/87

[56] References Cited

U.S. PATENT DOCUMENTS 4,240,044 12/1980 Fahlen et al. ........................ 372/87
4,380,079 4/1983 Cohn et al. ........................... 372/86
4,503,542 3/1985 Cirkel et al. .......................... 372/87

FOREIGN PATENT DOCUMENTS 0048407 3/1982 European Pat. Off. ............. 372/87
2098389 11/1982 United Kingdom .
2098791 11/1982 United Kingdom .

OTHER PUBLICATIONS

Publication: Optics Communication, vol. 44 (1982), p. 125, Author: Gerald J. Ernst.

Primary Examiner—Léon Scott, Jr.
Attorney, Agent, or Firm—Herbert L. Lerner; Laurence A. Greenberg

[57] ABSTRACT

A transversely excited gas laser, includes: an elongated gas-filled discharge chamber having an optical axis; a main cathode electrode and a main anode electrode extended along the optical axis in the discharge chamber defining a main discharge space between the main cathode and the main anode electrodes through which the optical axis extends, the main electrodes bordering two sides of the main discharge space leaving two other sides open; two pairs of auxiliary electrodes each being extended parallel to the optical axis in vicinity of a respective one of the open sides of the main discharge space and mutually spaced apart by a given distance, each of the auxiliary electrodes including a conductor and a dielectric shell surrounding the conductor, each of the auxiliary electrodes being spaced from all of the other electrodes by a set breakdown distance; and a driving unit connected to the electrodes, the driving unit supplying different potentials to the main cathode and main anode electrodes producing a main electric discharge therebetween during operation of the gas laser, and the driving unit supplying different potentials to the pairs of auxiliary electrodes causing a corona discharge preionizing the gas in the main discharge space to take place therebetween across the given distance during operation of the gas laser.

16 Claims, 4 Drawing Figures

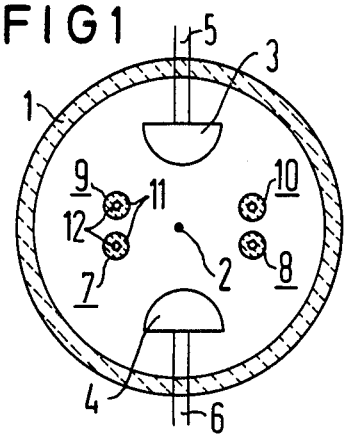
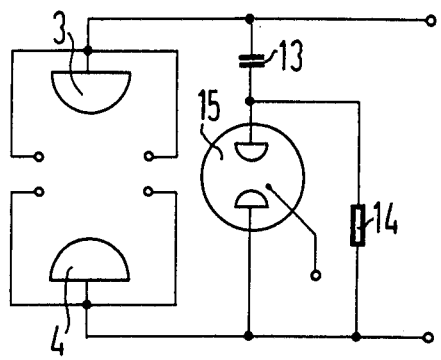
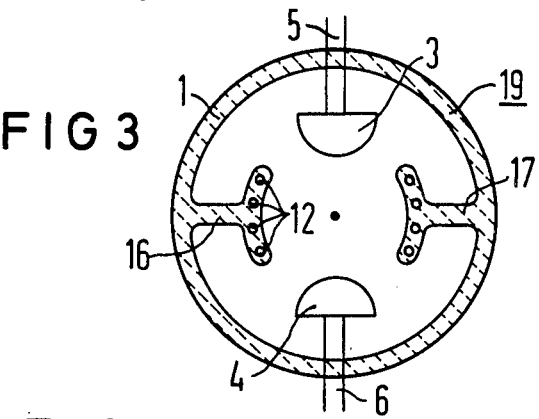
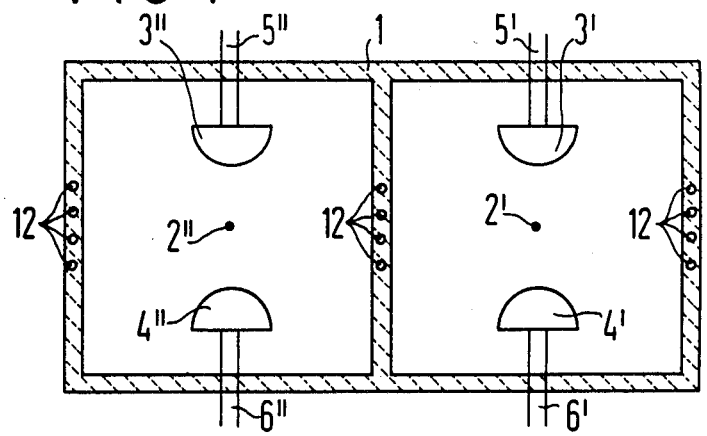

TRANSVERSELY EXCITED GAS LASER

The invention relates to a transversely excited gas laser, especially a TEA laser, including an elongated gas-filled discharge chamber, having two optical elements which are located at the two end faces of the chamber and lie along a common axis or optical axis, two electrodes, such as a main cathode and a main anode, which are disposed in the interior of the chamber and extended along the optical axis in such a manner that the axis extends in the space or main discharge space between the main cathode and the main anode, at least two further electrodes or auxiliary electrodes, extended in vicinity of one of the two open sides of the main discharge space parallel to the optical axis, each auxiliary electrode being formed of a conductor surrounded by a dielectric shell maintained at a breakdown distance from all of the other electrodes, a driving unit through which the main cathode and the main anode and connected to different potentials in such a way that an electric discharge or main discharge takes place between them, during the operation of the gas laser, and the auxiliary electrodes being connected to such potentials that a corona discharge preionizing the gas of the main discharge emanates from them during the operation of the gas laser.

Such a laser is known from German Published, Non-Prosecuted Application DE-OS No. 30 35 730.

As is well known, TE (Transversely Excited) lasers attain their full output only if a large-volume homogeneous discharge occurs between the two electrodes which extend parallel to the optical axis. Accordingly, care must be taken above all to ensure that field concentrations cannot develop in the discharge space and to ensure that a sufficiently large amount of free electrons are already present prior to every discharge.

In order to meet these requirements, the following electrode system is proposed, among other things, in the above-mentioned German Application: Two elongated, solid, main electrodes are curved forward toward their respective counter electrodes and are each provided at their outer flanks or sides with a rod-shaped dielectrically enclosed auxiliary electrode. The apparatus is constructed in such a way that during the operation of the laser, a corona discharge first takes place between the main electrodes and the auxiliary electrodes associated with them. This discharge generates UV-light which in turn ionizes the gas filling and thereby initiates the main discharge. Such an electrode configuration can be constructed in a relatively simple manner, but requires corresponding electrodes to be exactly matched as to shape and position. It has furthermore been found that the ionizing effect is not always sufficient to reliably preclude an arc discharge even at increased gas pressures and relatively low voltages.

The ionizing effect could probably be further improved by modifications of the electrode geometry. Thus, the auxiliary electrode could be placed closer to the apex of the curved main electrode surface, as discussed in U.S. Pat. No. 4,240,044 and in addition, it could be placed into a tray-like depression in the main electrode. However, narrow limits apply to these attempts since the conditions for the main discharge must not be substantially worsened.

Good results are obtained with auxiliary electrodes in the form of plates which terminate the two open sides of the space defined by the main electrodes (the main discharge space) and are covered on the inside thereof by a further insulating plate, as seen in the publication: Optics Communications, vol. 44 (1982), page 125. With proper construction, a corona discharge covers the entire plate surface and thus forms a large-area UV source. However, it is an unsatisfactory disadvantage of this device that the optimum plate thickness depends upon and is sensitive to the geometry of the main electrodes and, in addition, depends upon the kind and pressure of the gas. If the plate is too thin, surface discharges occur along the insulator, and if the plate is too thick, the energy which can be transferred to the corona discharge is decreased, i.e., the ionization is insufficient. To this extent, an exact matching of a number of laser parameters to each other in this case is also unavoidable. Further difficulties are expected if the laser operates with a sealed-off discharge chamber ("Sealed-off Laser"), since in this case the partial pressures of the individual gas components absolutely and relatively change over time. It is a further disadvantage that the plates heavily impede the gas interchange necessary for a rapid pulse sequence between the main discharge space and its environment.

It is accordingly an object of the invention to provide a transversely excited gas laser which overcomes the hereinafore-mentioned disadvantages of the heretofore-known devices of this general type, to equip a gas laser with a preionizing device which can be fabricated and built-in efficiently, which leaves a relatively free choice regarding the main electrodes, the gas pressure, the nature of the gas and the voltage, and is also suitable for sealed-off lasers with rapid pulse sequences.

With the foregoing and other objects in view there is provided, in accordance with the invention, a transversely excited gas laser, especially a TEA laser, comprising:

an elongated gas-filled discharge chamber having an optical axis;

a main cathode electrode and a main anode electrode extended along the optical axis in the discharge chamber defining a main discharge space between the main cathode and main anode electrodes through which the optical axis extends, the main electrodes bordering or closing off two sides of the main discharge space leaving two other sides open;

at least one pair of auxiliary electrodes each being extended parallel to the optical axis in vicinity of a respective one of the open sides of the main discharge space and mutually spaced apart by a given distance, each of the auxiliary electrodes including a conductor and a dielectric shell or jacket surrounding the conductor, each of the auxiliary electrodes being spaced from all of the other electrodes by a set breakdown distance; and a driving or triggering unit connected to the electrodes, the driving unit supplying different potentials to the main cathode and main anode electrodes producing a main electric discharge therebetween during operation of the gas laser, and the driving unit supplying different potentials to the pairs of auxiliary electrodes causing a corona discharge preionizing the gas in the main discharge space to take place therebetween across the given distance during operation of the gas laser, i.e. the auxiliary electrodes approach each other to such a degree and the potentials supplied thereto are different to such a degree as to cause the corona discharge.

The auxiliary electrode part of a laser according to the invention operates largely autonomously because first of all the corona discharge does not burn toward one of the main electrodes, but instead takes place directly between the auxiliary electrodes. The pairs of auxiliary electrodes can be placed in such a way that vigorous ionization takes place in all important regions of the main discharge chamber and the subsequent main discharge can take place homogeneously. This is particularly true if several auxiliary electrode pairs are provided on both sides of the optical axis, and more specifically outside the main discharge space. This is because in this case, the UV light is generated in extensive, advantageously positioned areas and, in addition, the electric field at the edges of the main discharge path is influenced positively. The auxiliary electrodes, which are located on one respective side of the main discharge space, can be combined structurally in a single easy-to-assemble part and may, if required, be integrated without a problem into the wall of the vessel as well. The circuitry required may also be kept to a minimum: The power supply for the main and auxiliary electrodes comes from one source and it is generally sufficient to connect the auxiliary electrodes in parallel with the main electrodes. The energy content of the corona discharge is determined in this case solely by the structure of the pairs of auxiliary electrodes. A sealed-off laser constructed in accordance with the invention has a relatively constant output power and in addition, permits a high pulse repetition frequency since the discharge space can communicate with the ballast space over its entire length and over a large area and thus ensures a rapid regeneration of the gas of the discharge path, which is an essential condition for short pulse spacings.

The present gas laser is particularly recommended for laser distance measuring equipment for mobile use.

In accordance with another feature of the invention, there are provided two optical elements each being disposed at a respective end of the discharge chamber along a common optical axis.

In accordance with a further feature of the invention, a first two of the auxiliary electrodes are electrically connected to one of the main electrodes and a second two of the auxiliary electrodes are electrically connected to the other of the main electrodes.

In accordance with an added feature of the invention, one of the auxiliary electrodes of each pair is electrically connected to one of the main electrodes and the other of the auxiliary electrodes of each pair is electrically connected to the other of the main electrodes.

In accordance with an additional feature of the invention, one of the auxiliary electrodes of each pair is disposed relatively closer to or facing toward the main cathode electrode and is connected to the main anode electrode and the other of the auxiliary electrodes of each pair is disposed relatively farther from or facing away from the main cathode electrode and is connected to the main cathode electrode.

In accordance with again another feature of the invention, the one auxiliary electrodes are sufficiently close to the main cathode electrode to produce a corona discharge therebetween, and the other auxiliary electrodes are sufficiently close to the main anode electrode to produce a corona discharge therebetween.

In accordance with again a further feature of the invention, the auxiliary electrodes include at least one auxiliary anode and at least one auxiliary cathode disposed in vicinity of each respective open side.

In accordance with again an added feature of the invention, the auxiliary electrodes are disposed outside of the main discharge space.

In accordance with again an additional feature of the invention, the dielectric shells of the auxiliary electrodes disposed on at least one of the open sides are combined to form a common dielectric shell.

In accordance with yet another feature of the invention, the common dielectric shell has a concave profile facing the main discharge space.

In accordance with yet a further feature of the invention, the discharge chamber has a side wall and the auxiliary electrodes are integrated into the side wall.

In accordance with yet an added feature of the invention, a plurality of auxiliary electrodes are disposed in vicinity of each respective open side, and the auxiliary electrodes are alternating auxiliary cathode and auxiliary anode electrodes.

In accordance with yet an additional feature of the invention, each of the auxiliary electrodes are electrically connected directly to a respective one of the main electrodes.

In accordance with still another feature of the invention, there is provided another discharge chamber forming a folded or doubled over gas laser including another main cathode electrode and another main anode electrode disposed adjacent the respective first-mentioned main cathode and main anode electrodes, another main discharge space, and at least one other pair of auxiliary electrodes disposed between the adjacent main electrodes for preionizing the gas in both of the main discharge spaces.

In accordance with a concomitant feature of the invention, the main electrodes are mirror-symmetrical to each other with respect to a first plane, and the auxiliary electrodes are mirror-symmetrical to each other with respect to a second plane perpendicular to the first plane.

Other features which are considered as characteristic for the invention are set forth in the appended claims.

Although the invention is illustrated and described herein as embodied in a transversely excited gas laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic, cross-sectional view of a first embodiment of the invention;

FIG. 2 is a schematic circuit diagram of the operating circuit of the embodiment of FIG. 1;

FIG. 3 is a view similar to FIG. 1 of another embodiment of the invention; and

FIG. 4 is a cross-sectional view of a third embodiment of the invention.

For the sake of clarity, the figures are highly diagrammatic and schematic and components which are not absolutely necessary for an understanding of the invention, such as the optical terminating elements, are not illustrated.

Referring now to the figures of the drawing in which corresponding parts are provided with the same reference symbols, and first particularly to FIG. 1 thereof, there is seen a pulsed TE gas laser which could be used, for instance, in distance measurement. The gas laser contains a cylindrical discharge vessel or chamber 1 which is terminated at both ends thereof by non-illustrated resonator mirrors. The two mirrors define the optical axis of the laser which is symbolized in the figure by a point 2. Electrodes in the form of a main cathode 3 and a main anode 4 are disposed above and below the axis 2. The electrodes occupy almost the entire length of the laser tube and are extended parallel to each other with a predetermined spacing therebetween. The surfaces of the electrodes protrude or curve forward in a conventional manner, so that field inhomogeneities are prevented from occuring as far as possible, in the space between the electrodes. Leads 5, 6 which are brought through the vessel wall, connect the electrodes to a circuit which is not shown in FIG. 1. Auxiliary cathodes 7, 8 and auxiliary anodes 9, 10 are located to the left and to the right of the axis 2. Each of these auxiliary electrodes is in the form of a hollow dielectric cylinder 11 which is extended parallel to the axis 2, and an electric conductor 12 lining the inner wall of the cylinder. The cavity enclosed by the discharge vessel 1 is filled with a laser gas mixture.

The following materials and dimensions are provided for the individual parts of the laser:

The vessel 1 is formed of $Al_2O_3$, it has a length of about 25 cm and an inside diameter of about 10 cm. The two main electrodes are formed of CrNi steel. The auxiliary electrodes 7, 8, 9 and 10 may be formed of $Al_2O_3$ sections which are metallized on the inside thereof. The gas components for a $CO_2$ gas laser may be $CO_2$, $N_2$ and He, for instance, mixed in a ratio of 15:15:70, with a total pressure of 1000 mbar.

FIG. 2 illustrates the structure of an operating circuit including a driving or triggering unit for the laser, in a particularly simple manner. A capacitor 13 is connected to the main electrodes 3 and 4 through a triggerable spark gap 15. The auxiliary electrodes 7-10 are connected in parallel with the main electrodes 3, 4. A resistor 14 serves as a potential connection.

Efficiencies of more than 10% have already been achieved through the use of an apparatus according to the invention.

FIGS. 3 and 4 show modified embodiments of the invention. The laser of FIG. 3 differs from the embodiment of FIG. 1 primarily by the features that two auxiliary electrode pairs are disposed on each side of the optical axis; that the two pairs each have a common dielectric envelope 16, 17; and that the vessel 1 and the dielectric envelopes 16, 17 together form one shaped piece 19. Adjacent auxiliary electrodes are alternatingly in contact with the main cathode and the main anode, respectively. More specifically, the two uppermost conductors 12 are led to the lower main electrode 4 and the two lowermost conductors 12 are led to the upper main electrode 3.

The laser of FIG. 4 has an optical axis 2', 2" which is doubled back or folded one time. In FIG. 4, two pairs of main electrodes 3', 4' and 3", 4" are disposed side by side and separated from each other by a partition defining two discharge chambers. Two pairs of auxiliary electrodes are integrated into the partition as well as into each of the two opposite outer walls of the discharge chambers. The auxiliary electrodes of the partition generate corona discharges at both wall sides.

The invention is not limited to the embodiments shown. Since the object of the invention is primarily to bring about usable corona discharges in the auxiliary electrode elements, considerable latitude remains above all, with respect to the mechanical construction. Thus it is possible, for instance, to provide other profiles for the main electrodes, to make the auxiliary electrodes of solid material, to use an electrically conductive material for the discharge vessel, or to bring asymmetry to the apparatus, without difficulty. Apart from this, one of ordinary skill in the art may expand the discharge switching circuit by using simple means such as an L-C member, in such a way that the main discharge is delayed in a defined manner relative to the preceding corona discharge. Otherwise, other types of lasers such as Excimer lasers, can also be considered.

The foregoing is a description corresponding in substance to German Application No. P 33 13 811.7, filed April 15, 1983, the International priority of which is being claimed for the instant application, and which is hereby made part of this application. Any material discrepancies between the foregoing specification and the aforementioned corresponding German Application are to be resolved in favor of the latter.

We claim:
1. Transversely excited gas laser, comprising:
   an elongated gas-filled discharge chamber having an optical axis;
   a main cathode electrode and a main anode electrode extended along said optical axis in said discharge chamber defining a main discharge space between said main cathode and main anode electrodes through which said optical axis extends, said main electrodes bordering two sides of said main discharge space leaving two other sides open.
   at least one pair of auxiliary electrodes each being extended parallel to said optical axis in vicinity of a respective one of said open sides of said main discharge space and mutually spaced apart by a given distance, each of said auxiliary electrodes including a conductor and a dielectric shell surrounding said conductor, each of said auxiliary electrodes being spaced from all of the other electrodes by a set breakdown distance; and
   a driving unit connected to said electrodes, said driving unit supplying different potentials to said main cathode and main anode electrodes producing a main electric discharge therebetween during operation of the gas laser, and said driving unit supplying different potentials to said pairs of auxiliary electrodes causing a corona discharge preionizing the gas in said main discharge space to take place therebetween across said given distance during operation of the gas laser.

2. Gas laser according to claim 1, including two optical elements each being disposed at a respective end of said discharge chamber along said optical axis.

3. Gas laser according to claim 1, wherein a first of said auxiliary electrodes is electrically connected to one of said main electrodes and a second of said auxiliary electrodes is electrically connected to the other of said main electrodes.

4. Gas laser according to claim 1, wherein one of said auxiliary electrodes of said pair is electrically connected to one of said main electrodes and the other of said auxiliary electrodes of said pair is electrically connected to the other of said main electrodes.

5. Gas laser according to claim 1, wherein one of said auxiliary electrodes of said pair is disposed relatively closer to said main cathode electrode and is connected to said main anode electrode, and the other of said auxiliary electrodes of said pair is disposed relatively farther from said main cathode electrode and is connected to said main cathode electrode.

6. Gas laser according to claim 5, wherein said one auxiliary electrode is sufficiently close to said main cathode electrode to produce a corona discharge therebetween, and said other auxiliary electrode is sufficiently close to said main anode electrode to produce a corona discharge therebetween.

7. Gas laser according to claim 1, wherein said auxiliary electrodes include at least one auxiliary anode and at least one auxiliary cathode disposed in vicinity of each respective open side.

8. Gas laser according to claim 1, wherein said auxiliary electrodes are disposed outside of said main discharge space.

9. Gas laser according to claim 1, wherein said dielectric shells of said auxiliary electrodes disposed on at least one of said open sides are combined to form a common dielectric shell.

10. Gas laser according to claim 9, wherein said common dielectric shell has a concave profile facing said main discharge space.

11. Gas laser according to claim 1, wherein said discharge chamber has a side wall and said auxiliary electrodes are integrated into said side wall.

12. Gas laser according to claim 9, wherein said discharge chamber has a side wall and said auxiliary electrodes are integrated into said side wall.

13. Gas laser according to claim 1, wherein a plurality of auxiliary electrodes are disposed in vicinity of each respective open side, and said auxiliary electrodes are alternating auxiliary cathode and auxiliary anode electrodes.

14. Gas laser according to claim 1, wherein each of said auxiliary electrodes are electrically connected directly to a respective one of said main electrodes.

15. Gas laser according to claim 1, including another discharge chamber including another main cathode electrode and another main anode electrode disposed adjacent said respective first-mentioned main cathode and main anode electrodes, another main discharge space, and at least one other pair of auxiliary electrodes disposed between said adjacent main electrodes for preionizing the gas in both of said main discharge spaces.

16. Gas laser according to claim 1, wherein said main electrodes are mirror-symmetrical to each other with respect to a first plane, and said auxiliary electrodes are mirror-symmetrical to each other with respect to a second plane perpendicular to the first plane.

* * * * *